Nov. 27, 1934.  R. H. DAISLEY  1,981,993
OIL CONTROL PISTON
Filed Sept. 2, 1933
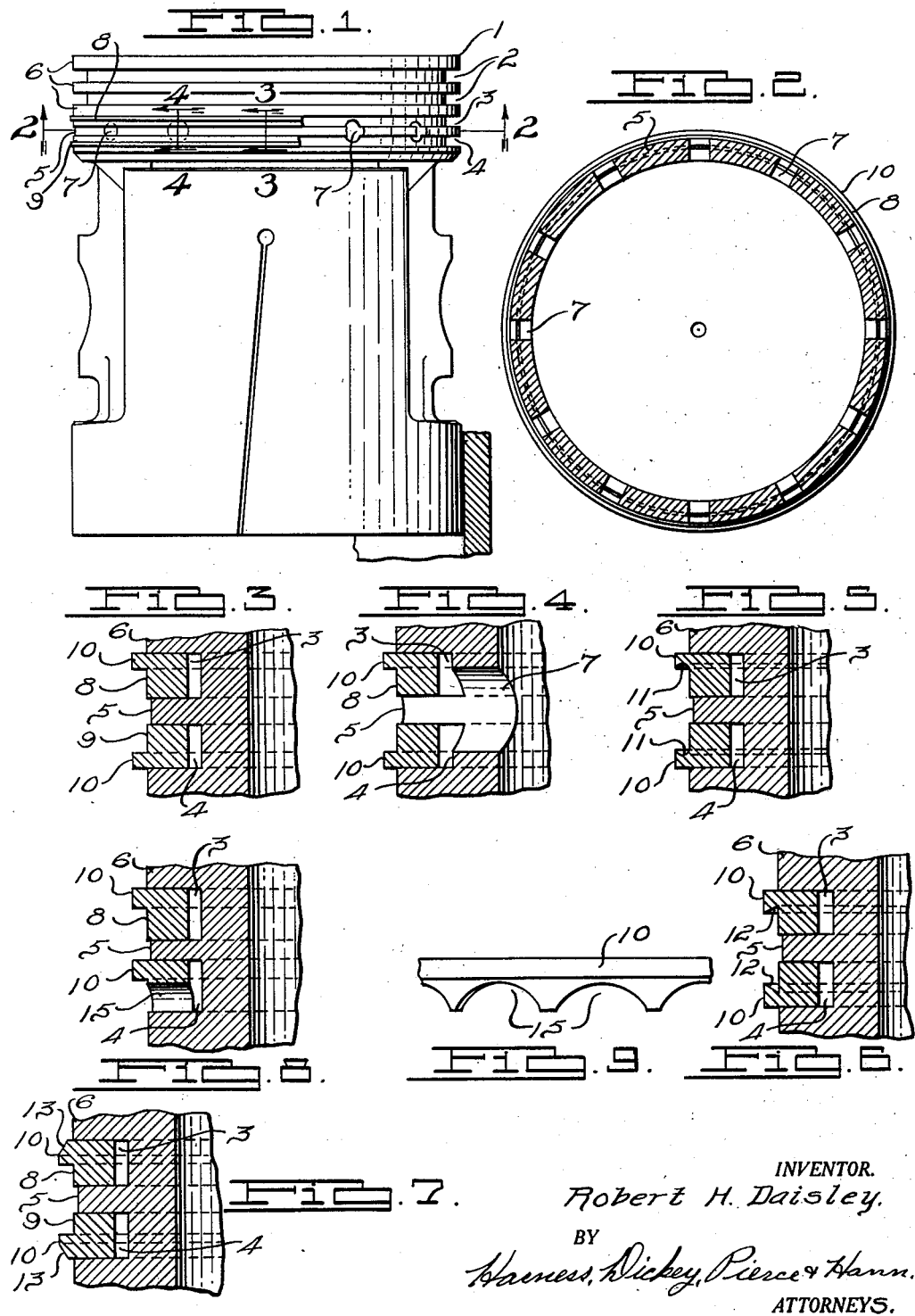
INVENTOR.
Robert H. Daisley,
BY
ATTORNEYS.

Patented Nov. 27, 1934

1,981,993

UNITED STATES PATENT OFFICE 1,981,993

OIL CONTROL PISTON

Robert H. Daisley, Birmingham, Mich., assignor to Wilcox-Rich Corporation, a corporation of Michigan Application September 2, 1933, Serial No. 687,977

7 Claims. (Cl. 309—7)

My invention relates to pistons and piston rings, particularly those used in internal combustion engines, and has special reference to piston and packing ring construction for the purpose of controlling the lubricating oil used in lubricating cylinder walls and preventing the same from working into the combustion chamber of the cylinder.

The conventional constructions in this respect usually comprise a hollow piston having its lower, or one of its lower, ring grooves provided with apertures leading through the piston wall to the interior of the piston and a piston ring having radial holes or slots through the body thereof to permit oil scraped from the cylinder wall to be drained inwardly through the holes or slots in the ring to the bottom of the groove and thence through the holes or apertures in the piston wall to the interior of the piston where it may fall or run back into the crankcase of the engine. It is conventional at the present time to provide such an oil control ring not only with radial slots or holes, but also with a circumferential channel in its outer face from the bottom of which the holes or slots extend through the ring. Such a construction provides a greater number of scraping edges in contact with the cylinder walls by reason of the division of the face of the ring by the channel, and also provides a greater unit pressure of the ring faces against the cylinder wall by reason of the elimination of part of the solid section of the ring at the face thereof and consequently concentrating the pressure developed by the tension of the ring at the reduced area of contact on either side of the channel.

Some of the objections to the conventional type of oil control ring just described lie in the fact that the ring consists of one piece of material and any high point in the cylinder wall will contact one edge of the ring force it inwardly and draw the edge of the ring on the opposite side of the channel out of contact with the cylinder wall, which reduces the surface contact with the cylinder and eliminates the efficiency of the ring in preventing oil from creeping past into the combustion chamber.

Another difficulty in the slotted or apertured type of oil control ring lies in the impossibility of providing a uniform radial pressure around the entire cylinder contact surface of the ring by reason of the fact that a part of the section of the ring is cut away to provide the ventilating aperture or slot which reduces the section of the ring and consequently its pressure in the area where the aperture or slot occurs as compared with the pressure in the area of the solid parts of the ring between the slots or apertures. This tends to cause the ring to wear into a polygonal shape and to produce non-uniform radial pressure against the cylinder wall, which, as wear occurs, permits increasing quantities of oil to creep past the ring toward the combustion chamber. It also appears that in the slotted type ring, as use continues, the slots will become partially or entirely clogged with carbon, apparently because the heat transfer from piston to cylinder is concentrated in the rings and brings about a higher temperature in them than in the piston wall. This higher temperature in the rings seems sufficient to carbonize the thin films of oil adhering to the sides and corners of the slots and gradually causes them to close and prevent sufficiently rapid elimination of the surplus oil to prevent pumping past the rings into the combustion chamber.

An object of my invention is to eliminate these objections to a great degree; to provide an oil control ring or ring and piston organization which will operate more efficiently in that it eliminates the apertured or slotted conventional type of ventilated ring, eliminates the condition which causes the conventional ring to clog and prevent elimination of surplus oil, to lessen its contact area with the cylinder wall by reason of irregularity in the cylinder wall, and which will maintain a sufficient ring surface in contact with the cylinder wall to insure the scraping of the maximum amount of oil from the wall, insure contact at all points on the cylinder wall, and provide a uniform and increased unit pressure of all parts of the face of the ring against the cylinder wall.

Other advantages reside in the use of a harder material for my rings than is possible with the slotted type. This is desirable and becoming more important as compression ratios in cylinders and engine speeds are increased in the development of greater power and efficiency. The present slotted ring is of unchilled cast iron which wears with considerable rapidity at high speed and is not of sufficient strength to develop the desirable high unit pressures. They must necessarily be of a comparatively soft material to permit the milling operations necessary to produce the slots. With my new organization the rings are not slotted and the necessary machining operations may all be performed by grinding thus permitting the use of a harder and stronger material such as steel or semi-steel castings, which will develop greater unit pressures and other wearing qualities.

Another advantage of my invention resides in the fact that my oil control rings may be made of the same casting as the compression rings used in the upper grooves of the piston, and subsequently readily machined to the desired shapes. This is an advantage over the conventional type of slotted or apertured ring which is usually made somewhat wider than the conventional compression rings in order to provide sufficient surface contact with the cylinder and also to provide the necessary dimension to permit the machining of the slots and channels in the ring without destroying its strength; such rings must be made from special castings at increased cost.

Other objects and features of novelty of my invention will be either specifically pointed out or will become apparent, when referring, for a better understanding of my invention, to the following description in conjunction with the accompanying drawing, wherein:

Figure 1 is a view in elevation of a piston forming a part of my invention.

Fig. 2 is a cross-sectional view taken on line 2—2 of Fig. 1.

Fig. 3 is a cross-sectional view taken on line 3—3 of Fig. 1.

Fig. 4 is a cross-sectional view taken on line 4—4 of Fig. 1.

Fig. 5 is a cross-sectional view similar to Fig. 3 showing a modification of the ring structure which forms a part of my invention.

Fig. 6 is a cross-sectional view similar to Fig. 3 showing a second modification of the ring construction forming a part of my invention.

Fig. 7 is a cross-sectional view similar to Fig. 3 showing a third modification of the ring structure embodying my invention.

Fig. 8 is a cross-sectional view similar to Fig. 3, showing a fifth modification of the ring organization embodying my invention.

Fig. 9 is a side elevational view of the lower ring structure shown in Fig. 9.

The numeral 1 indicates a piston of the conventional type provided with circumferential grooves 2 in its upper portion adapted to receive compression rings of the conventional shape. The piston 1 is also provided in the lower portion of its head with a pair of grooves 3 and 4 which are separated by a narrow land 5 of the same or a lesser diameter than the lands 6 separating the compression ring grooves 2. The piston is also provided with spaced radial apertures 7 extending from the bottoms of the grooves 3 and 4 to the hollow interior of the piston. The apertures 7 are of a sufficient size to provide drainage from the bottoms of both of the ring grooves 3 and 4 and also from the face of the land 5 as shown in Figs. 1 and 4. Positioned in the grooves 3 and 4 are L-shaped rings 8 and 9 having reduced cylinder contacting faces 10 as shown in Figs. 3 and 4. These rings are of the split resilient type expanding by their own inherent tension radially of the piston and toward the cylinder wall. The cylinder contacting faces 10 of the rings are reduced to less than the entire width of the ring to provide a greater unit pressure against the cylinder wall as the entire pressure developed by the larger section of the ring will be exerted against the cylinder wall through the reduced faces 10. As the piston reciprocates in the cylinder, the faces 10 of the rings will scrape the cylinder walls and accumulate the surplus oil either in the space between the rings or below the lower ring. The oil accumulated in the space between the rings will seep between the rings and the side walls of their grooves to the bottom of the grooves and find its way through the drainage apertures 7 leading to the interior of the piston from which it will drain back to the crankcase of the engine. Such surplus oil will also be drained to the interior of the piston through those portions of the apertures 7 which extend through the lands 5 between the rings thus providing for an adequate and quick drainage of surplus oil. The use of the two rings in combination with the two grooves and the drainage aperture extending also through the land between them provides a double assurance, as compared with the use of the single ring, against the creeping of oil into the combustion chamber of the cylinder, as each ring is separately and independently operable in its own groove and will not be affected in its operation by any wear or inequalities affecting the other ring, and the independence of the rings from one another and their spacing insures against both rings being affected at the same time by inequalities in the cylinder wall. Elimination of the slots in the rings for drainage purposes also provides assurance against clogging of the drainage apertures, as the increased size of the apertures through the piston walls, extending as they do through the land between the rings in the cooler area of the piston will not fill with carbon.

In the modification shown in Fig. 5, the sides of the projecting cylinder contacting portions 10 are provided with a rounded undercut as at 11 thus providing a knife edge at one edge of the cylinder contacting face which, as wear occurs, will preserve its sharp scraping edge.

A similar form of ring structure is shown in Fig. 6 where the sides of the projecting cylinder contacting portions 10 are undercut in an angular manner as shown at 12 to provide the sharp knife-like scraping edges which will retain their form as wear occurs.

In the modification shown in Fig. 7, the projecting portions 10 of the rings are somewhat thicker than those shown in Fig. 3 and are beveled at the outer edge 13 reducing the cylinder contacting surface and thereby increasing the unit pressure. The beveling also has the effect of balancing the ring section to some extent and eliminating any tendency it might have because of its irregular section to twist or warp and bind in its groove.

In the modification shown in Fig. 8 the lower ring has its cylinder contacting portion on the top side of the ring rather than on the bottom side as in the other figures. This arrangement may be used if desired where thicker rings are used to develop higher unit pressures, as the available drainage space between the cylinder contacting portions of the upper and lower rings will be increased in proportion to the thickness of the rings, so that ample space will be provided to receive the oil scraped from the cylinder wall. However additional assurance of ample oil drainage may be provided in this arrangement by scalloping, or relieving at intervals, the lower edge of the lower ring as indicated by the numeral 15, so that oil scraped by the cylinder contacting portion 10 of the lower ring will find ready outlet through the vents 15 to the back of the groove and thence through the apertures 7 to the interior of the piston.

This space between the rings and the amplitude of the drainage through the land between the rings is important as it is necessary that it be of sufficient capacity to hold and carry away all the oil scraped on the down stroke of the piston and so prevent any appreciable quantity from being carried between the rings on the up stroke. Such carrying over builds up a body of oil under pressure between the rings which will pump or creep past the upper ring on the suction stroke of the piston and find its way into the combustion chamber. Such pressure also retards the radial expansion of the upper ring and reduces its pressure against the cylinder wall and thus aggravates the oil pumping.

The provision of drainage apertures in the face of the land between the rings insures ample drainage capacity, reduces danger of clogging, and relieves oil pressure between or behind the rings which would cause or aid oil pumping, and the provision of drainage apertures of sufficient size to commonly serve both the space between the rings at the face of the land and the ring grooves substantially increases insurance against oil pumping.

The ring construction shown in Figs. 3, 4, 5, 6 and 7 may be made from the same castings as the conventional solid compression rings, and thus eliminating the expense of different or special castings such as are necessary for slotted and channelled rings. By simple and easy machining operations the faces of the rings may be reduced as shown in the figures to produce the reduced cylinder contacting faces. They may also be made of a harder and less easily machinable material than the slotted type of ring as they may be machined to shape by grinding. The slotting and channeling operations necessary to form such a ring as the conventional slotted ring are eliminated.

Formal changes may be made in the specific embodiment of the invention described without departing from the spirit and substance of the broad invention, the scope of which is commensurate with the appended claims.

I claim:

1. A hollow piston having a pair of ring grooves therein, separated by a land having radial apertures therein, each such aperture leading from the circumferential surface of said land and also from the bottom of both said grooves to the interior of said piston, said apertures being of such area as to permit a substantial flow of oil therethrough.

2. A hollow piston having a pair of ring grooves therein, separated by a land of less diameter than the diameter of the piston, and having radial apertures therein, each such aperture leading from the circumferential surface of said land and also from the bottom of both said grooves to the interior of said piston and being of such area as to permit a substantial flow of oil therethrough.

3. A combination of a hollow piston having a pair of grooves therein separated by a land and having radial apertures therein, each such aperture leading from the circumferential surface of said land and also from the bottom of both said grooves to the interior of said piston and being of such area as to permit a substantial flow of oil therethrough, and a pair of oil scraping rings radially expansible in said grooves for delivering surplus oil to the drainage apertures extending through the land between said grooves.

4. In a hollow piston, an oil control organization comprising a pair of oil scraping rings mounted in the grooves of said piston, a land of said piston separating said rings and their grooves, and large oil drainage apertures, each aperture intercepting said ring grooves and said interposed land and leading through said piston wall to the interior of said piston.

5. The combination of a hollow piston having a pair of ring grooves therein separated by a land having oil drainage vents therein leading from the exterior surface of said land and the bottom of said grooves to the interior of said piston and being of such area as to permit a substantial flow of oil therethrough, and a pair of oil scraping rings radially expansible in said grooves, the upper ring of said pair being solid section and the lower ring having oil drainage vents therethrough.

6. The combination of a hollow piston having a pair of ring grooves therein separated by a land having oil drainage vents therein leading from the exterior surface of said land to the interior of said piston and open to said ring grooves, said vents being of such area as to permit a substantial flow of oil therethrough, and a pair of oil scraping rings radially expansible in said grooves, the upper ring of said pair being solid section and the lower ring having a projected cylinder contacting face on its upper side and having oil drainage vents leading through its lower side beneath said cylinder contacting face.

7. A combination of a hollow piston having a pair of grooves therein separated by a land having radial apertures therein, at least one of said apertures being of such width as to cut entirely through a land and at least a portion of the bottoms of both said grooves to the interior of said piston, for providing large oil drainage vents, and a pair of oil scraping rings radially expansible in said grooves and having reduced cylinder contacting faces disposed on the sides of said rings remote from said land and adapted to scrape and deliver oil to said drainage vents in the land between said rings.

ROBERT H. DAISLEY.